2,801,232

DIEPOXY RESINOUS COMPOSITIONS

Tzeng Jiueq Suen, New Canaan, and George Hewlett Hicks, Stamford, Conn., assignors to American Cyanamid Company, New York, N. Y., a corporation of Maine No Drawing. Application October 1, 1953,
Serial No. 383,710

18 Claims. (Cl. 260—78.4)

This invention relates to epoxide resinous compositions. More particularly, this invention relates to diepoxy resinous compositions possessing increased resistance to thermal shock, their meethods of production and articles made therefrom.

It is known that diglycidyl or diepoxy compounds react with dibasic acid anhydrides to form thermosetting resins. The method employed for preparing the resinous polyester compositions from the diepoxy compounds and the dicarboxylic acid anhydride required the employment of 2 mols of the anhydride with each mol of the diepoxy compound. However, the resinous compositions thus prepared were unsuitable for certain applications, as for example when the material was subjected to severe thermal shock.

We have found that by incorporating another difunctional compound, more specifically a saturated alpha, omega dicarboxylic acid or a saturated alpha, omega-dihydric alcohol, each containing from 4 to 12 carbon atoms, into the composition a superior product may be obtained. The thermal shock and also insert-crack resistance from products prepared therefrom are greatly improved.

It is an object of our invention to prepare diepoxy resinous compositions. It is a further object of our invention to prepare diepoxy resinous compositions with increased resistance to thermal shock. These and other objects of our invention will be discussed more fully hereinbelow.

In the preparation of the resinous composition of our invention, a diepoxy ester of a dicarboxylic acid is employed. More particularly, the diglycidyl ester of a dicarboxylic acid finds use in our invention. The preparation of the diglycidyl ester of a dicarboxylic acid may be prepared by an expedient well known in the art. The following example is set forth solely for the purpose of illustration of the manner in which a diglycidyl ester of a dicarboxylic acid may be prepared, and specific enumeration of detail therein should not be interpreted as limitations on the case, except as indicated in the appended claims. All parts are parts by weight.

PREPARATION OF DIGLYCIDYL PHTHALATE 198 parts of dipotassium phthalate and 277.6 parts of epichlorohydrin are introduced into a suitable reaction chamber and heated at a temperature above 105–110° C. for about 1–2 hours with a quaternary ammonium salt as a catalyst. The potassium chloride produced is removed either by filtration or washing with water. The excess epichlorohydrin is stripped under vacuum and the resultant product is diglycidyl phthalate of a technical grade. For purification purposes, the diglycidyl phthalate produced may be further vacuum distilled.

Quite obviously, in the preparation of these diglycidyl esters of the dicarboxylic acids, one may use any of the reactive halohydrins, such as epibromohydrin and epiiodohydrin. As the other reactable component, one may use the alkali and alkali-earth metal salts of the dicarboxylic acids, such as the sodium, potassium, lithium, calcium, barium salts and the like.

In the preparation of the diglycidyl esters, any of the dicarboxylic acids may be used, such as the saturated dicarboxylic acids and the ethylenically unsaturated dicarboxylic acids. The former acids are the dicarboxylic acids which are free from non-benzenoid unsaturation. Examples of these acids are such as phthalic, succinic, glutaric, sebacic, adipic, suberic, azelaic, and the like. Representative of the ethylenically unsaturated dicarboxylic acids which may be employed in the preparation of the diglycidyl esters are such as maleic, fumaric, itaconic, citraconic, and the like. While any diglycidyl ester of a dicarboxylic acid may find employment in our invention, it is preferred that the dicarboxylic acids used contain from 4 to 12 carbon atoms.

When a diglycidyl compound is reacted with a dibasic acid anhydride, a very rigid product is obtained which lacks flexibility. We have found that by reacting a saturated alpha, omega-dibasic acid or a saturated alpha, omega, glycol each containing from 4–12 carbon atoms with a diglycidyl compound to obtain a reaction product which is then reacted with a dibasic acid anhydride, a resinous composition of improved physical properties is obtained. In the practice of our invention, it will be seen that the dicarboxylic acid or dihydric alcohol that is reacted with the diglycidyl compound acts as a difunctional compound. The difunctional compound that may be reacted with the diglycidyl ester preferably contains from 4 to 12 carbon atoms. Examples of the saturated dihydric alcohols that may be used in our invention are 1,4 - butanediol, 1,5 - pentanediol, 1,6 - hexanediol, 1,7- heptanediol, 1,12 - dodecanediol and the like. The saturated dicarboxylic acids that may be utilized in our invention are such as succinic, glutaric, adipic, pimelic, suberic, sebacic, and the like.

When a saturated dibasic acid is reacted with the diglycidyl compound in accordance with our invention, the reaction product may be formed at temperatures ranging from room temperature up to about 150° C. Although the reaction product may be formed at room temperature, the time required for the production of the reaction product is too long to be practical. At temperatures about or greater than 150° C., the exothermic heat of reaction is very great and it is difficult to control the formation of the product. Therefore, it is preferred that a temperature of from about 40° C. to about 150° C. be employed in the formation of the reaction product. It is obvious that at higher temperatures the time required for the reaction to be completed will be less than at lower temperatures. The reaction is allowed to proceed until the acid number of the reaction mixture approaches zero, at which time the heat applied is removed and the composition may be lowered to room temperature or the dibasic acid anhydride may be added to form the final reaction mixture. When a saturated dihydric alcohol is employed in the process of our invention, the temperatures utilized are comparable to the temperatures employed when a dibasic acid is reacted with the diglycidyl compound although in general slightly higher temperatures may be employed if desired. In the instance of a dihydric alcohol, the reaction is allowed to run until a substantially constant viscosity of the reaction mixture is obtained. The viscosity of the reaction mixture may vary over rather wide limits, depending upon the particular reactants employed. As the size of the molecule increases, the viscosity of the mix will rise, but a point is reached at which the viscosity levels off. When this occurs, the heat applied, if any, is removed and the reaction mixture may then be lowered to room temperature or the dibasic acid anhydride may be added to form the final reaction mixture. While it is not necessary, an acidic catalyst such as stannic chloride, sulfuric acid, and the like, may be utilized to shorten the reaction time when a dihydric alcohol is reacted with the diglycidyl compound.

The reaction product of the diglycidyl compound and the saturated dibasic acid or the saturated dihydric alcohol is mixed with a dibasic acid anhydride to form the final heat hardenable reaction mixture. The anhydrides of dicarboxylic acids including cyclic and polymeric anhydrides of aliphatic, cycloaliphatic, and aromatic dicarboxylic acids can be used in the practice of our invention. Illustrative examples of such anhydrides that may be employed are succinic, phthalic, maleic, 1,4 - cyclohexane dicarboxylic, 1,2 - cyclohexane dicarboxylic, naphthalic anhydrides, and the like. It is preferred that anhydrides of dicarboxylic acids having from 4 to 12 carbon atoms be employed in our invention. When it is desired to impart fire-resistant properties to the resinous materials, chlorinated anhydrides of dicarboxylic acids such as tetrachlorophthalic anhydride, and hexachloroendomethylene tetrahydrophthalic anhydride may be used. The mols of the anhydride employed with respect to the saturated dibasic acid or saturated dihydric alcohol may vary from 1:10 to 10:1, respectively. The total amount of the saturated dibasic acid or saturated dihydric alcohol and dibasic acid anhydride used may vary between 1:3 to 3:1 mols per mol of the diglycidyl compound employed. However, in the first stage reaction between the dibasic acid or dihydric alcohol and the diglycidyl compound, the latter must be in excess of 0.5 mol per mol of the difunctional acid or alcohol so that some epoxy groups will remain available to further react with the dibasic acid anhydride in a later stage reaction.

The dibasic acid anhydride is introduced into the reaction product of the diglycidyl compound and the saturated dibasic acid or saturated dihydric alcohol. Depending upon the particular reactants chosen, it is sometimes necessary to slightly warm the mixture to make them compatible. The viscosity of the compatible mixture may vary from a very low viscosity up to a mixture having the consistency of a thick paste and is dependent upon the particular reactants utilized. When the resinous composition is to be used as an adhesive, it is desirable to have a very highly viscous mixture prior to its cure. For laminating purposes it is desirable to employ the reaction mixture possessing a low viscosity. It is only necessary that the mix be pourable before it is cured. Obviously, if the mixture were not pourable, it could not be placed in a mold wherein curing takes place. No curing agent is required to cure the mix. The mixture will cure to an insoluble and infusible state at room temperature, but in order to expedite the cure it is preferred that a temperature from about 40° C. to about 150° C. be employed. No pressure is required to cure the resinous materials, but in some instances, when the resinous materials is employed as an adhesive, it may be desirable to apply pressure during its cure.

If it is desired, a filler may be introduced into the reaction mixture prior to its final cure. Suitable fillers that find employment in our invention are such as asbestos, wood flour, alpha cellulose, carborundum, chopped rags, clay, and the like. Both inorganic and organic fillers may be employed. The amount of the filler that is introduced into the reaction mixture will depend upon the ultimate use of the resinous material. Therefore, amounts as great as 75% by weight, based on the weight of the resinous material, may be employed. In the event colored resinous materials are desired, dyes and/or pigments may be introduced in suitable amounts.

In order that those skilled in the art may more fully understand the inventive concept herein presented, the following examples are given by way of illustration and not limitation unless otherwise noted in the appended claims. All parts are parts by weight.

*Example 1*

184 parts of teechnical grade diglycidyl phthalate and 142 parts of adipic acid are charged into a three-necked flask equipped with an agitator and thermometer, heated to 110° C., this temperature being maintained until the acid number of the composition approaches zero, at which time it is lowered to room temperature.

To 100 parts of the above product is added 33 parts of phthalic anhydride and the mixture stirred to form a thick paste. This paste is then applied to the ends of 1 x 3 inch flat aluminum strips, and glued as an overlap joint having an area of one square inch. The samples were enclosed in cellophane and in a piece of white bond paper and placed in a jig at approximately 100 p. s. i. The samples are cured at 105° C. for a period of 19 hours.

Measurement of the shear strength of the above samples gives a value in the range of 1870–1890 p. s. i.

*Example 2*

1620 parts of technical diglycidyl phthalate (about 69% pure based on oxirane oxygen content) and 146 parts of adipic acid are charged into a three-necked flask equipped with an agitator and thermometer, and heated to 110° C. This temperature is maintained until the acid number of the composition approaches zero at which time it is lowered to room temperature. The product is very viscous and amber in color.

To 121.4 parts of the above product is added 106.8 parts of phthalic anhydride which is dissolved by warming the mixture to 90–100° C. for a short time. The solution is poured into a round aluminum mold having a diameter of 2 inches containing a removable 1.25" x 1.25" x 0.75" steel insert. The cast is cured at 130° C. for two hours, then removed from the oven and cooled to room temperature.

The cured resin with steel insert was then submitted to the thermal shock test as described below. It passes 10 cycles.

Thermal shock test procedure:
(a) Apparatus—a gravity convection type oven maintained at 130° C.±1° C. An alcohol-Dry Ice bath at −57° C.±1° C.
(b) Procedure—specimens were placed in the oven for ½ hour at the specified temperature, removed and immediately plunged into the alcohol-Dry Ice bath and left there for 10 minutes. This cycle is repeated until the resin fails by cracking away from the insert.

*Example 3*

2,830 parts of technical diglycidyl phthalate and 146 parts of adipic acid are reacted as in Example 2 to an acid number approaching zero.

The product from the above reaction has a viscosity of 120–125 poises and is amber in color.

242.5 parts of resin are warmed to 100° C. with 177.9 parts of phthalic anhydride. After solution is obtained, the material is poured into an aluminum mold having a 2-inch diameter containing a removable 1.25" x 1.25" x 0.75" steel insert. The material was cured at 130° C. for two hours, then removed from the oven to cool to room temperature.

The cured resin with steel insert was then submitted to the thermal shock test as described in Example 2. It passes 10 cycles.

*Example 4*

556 parts of technical diglycidyl phthalate and 104 parts of 1,5-pentanediol along with 0.36 part of stannic chloride are charged into a three-necked flask equipped with an agitator and thermometer and heated to 150° C. This temperature was maintained for 4 hours, at the end of this time the reaction mixture is lowered to room temperature, and the material discharged. The determination of the epoxide content of the product yields an oxirane oxygen value of 3.6 percent or an epoxide equivalent of 444 grams. The product from this reaction has a viscosity at 25° C. I–J on Gardner-Holdt scale and is amber in color.

To 36 parts of this product was added 14.8 parts of phthalic anhydride. The material was then handled in the same way as Examples 2 and 3 above. It passes 10 cycles of the thermal shock test.

*Example 5*

162 parts of diglycidyl phthalate and 20.2 parts of sebacic acid are charged into a three-necked flask and reacted as in Example 2 to an acid number approaching zero.

The product from the above reaction has a viscosity at 25° C. of $Z_3$–$Z_4$ on Gardner-Holdt scale and is amber in color.

To 122 parts of the product is added 88.8 parts of phthalic anhydride. The material is warmed to 95–100° C. to enhance solution and is further treated as in Example 2. It passes 10 thermal shock cycles.

In order to show the increased resistance of the resinous composition of our invention to thermal shock the following comparative example is set forth. The comparative composition was prepared in accordance with methods well known in the prior art. All parts are parts by weight.

*Comparative Example 1*

116.2 parts of technical diglycidyl phthalate and 88.8 parts of phthalic anhydride are charged into a 200-ml. tall form beaker and warmed for a short time to 95–100° C. in order to enhance solution. This material is cured with a steel tube insert for 2 hours at 130° C. and then subjected to the thermal shock test does not pass one cycle.

The resinous compositions produced in accordance with our invention are of particular value as casting resins, potting compounds, and adhesive binders wherein resistance to thermal shock and insert cracking is desired. The resinous compositions may also find uses as laminating resins and as a surface coating or finish for various materials.

We claim:

1. A composition of matter which comprises the heat-hardenable reaction mixture of a dicarboxylic acid anhydride and the reaction product of a diglycidyl ester of a dicarboxylic acid and a saturated difunctional compound containing from 4 to 12 carbon atoms of the group consisting of alpha, omega-dicarboxylic acids and alpha, omega-dihydric alcohols; wherein the molar ratio of said ester to said difunctional compound is in excess of 1:2, the molar ratio of said anhydride to said difunctional compound is from 1:10 to 10:1 and the total amount of said difunctional compound and said anhydride is between 1:3 and 3:1 mols per mol of said ester.

2. A composition according to claim 1 in which said ester comprises diglycidyl phthalate.

3. A composition according to claim 1 in which said ester comprises diglycidyl phthalate and said difunctional compound comprises adipic acid.

4. A composition according to claim 1 in which said ester comprises diglycidyl phthalate and said difunctional compound comprises sebacic acid.

5. A composition according to claim 1 in which said ester comprises diglycidyl phthalate and said difunctional compound comprises 1,5-pentanediol.

6. A composition according to claim 1 in which said anhydride comprises phthalic anhydride, said ester comprises diglycidyl phthalate and said difunctional compound comprises adipic acid.

7. A composition according to claim 1 in which said anhydride comprises phthalic anhydride, said ester comprises diglycidyl phthalate and difunctional compound comprises sebacic acid.

8. A composition according to claim 1 in which said anhydride comprises phthalic anhydride, said ester comprises diglycidyl phthalate and said difunctional compound comprises 1,5-pentanediol.

9. A composition according to claim 1 in which said anhydride comprises phthalic anhydride and said ester comprises diglycidyl phthalate.

10. A composition of matter which comprises the cured product of the reaction of a mixture of a dicarboxylic acid anhydride and the reaction product of a diglycidyl ester of a dicarboxylic acid and a saturated difunctional compound containing from 4 to 12 carbon atoms of the group consisting of alpha, omega-dicarboxylic acids and alpha, omega-dihydric alcohols; wherein the molar ratio of said ester to said difunctional compound is in excess of 1:2, the molar ratio of said anhydride to said difunctional compound is from 1:10 to 10:1 and the total amount of said difunctional compound and said anhydride is between 1:3 and 3:1 mols per mol of said ester.

11. A composition according to claim 10 in which said ester comprises diglycidyl phthalate.

12. A composition according to claim 10 in which said ester comprises diglycidyl phthalate and said difunctional compound comprises adipic acid.

13. A composition according to claim 10 in which said ester comprises diglycidyl phthalate and said difunctional compound comprises sebacic acid.

14. A composition according to claim 10 in which said ester comprises diglycidyl phthalate and said difunctional compound comprises 1,5-pentanediol.

15. A composition according to claim 10 in which said anhydride comprises phthalic anhydride, said ester comprises diglycidylphthalate and said difunctional compound comprises adipic acid.

16. A composition according to claim 10 in which said anhydride comprises phthalic anhydride, said ester comprises digylcidylphthalate and said difunctional compound comprises sebacic acid.

17. A composition according to claim 10 in which said anhydride comprises phthalic anhydride, said ester comprises digylcidylphthalate and said difunctional compound comprises 1,5-pentanediol.

18. A composition according to claim 10 in which said anhydride comprises phthalate anhydride and said ester comprises diglycidyl phthalate.

No references cited.